US012769844B2

(12) United States Patent
Shankar

(10) Patent No.: US 12,769,844 B2
(45) Date of Patent: Oct. 20, 2026

(54) SYSTEM AND METHOD FOR PROVIDING A PROCESSOR BOOT FOR SAFETY PROTECTED MEMORIES

(71) Applicant: QUALCOMM INCORPORATED, San Diego, CA (US)

(72) Inventor: Jayashree Shankar, Chennai (IN)

(73) Assignee: Qualcomm Incorporated, San Diego, CA (US)

( * ) Notice: Subject to any disclaimer, the term of this patent is extended or adjusted under 35 U.S.C. 154(b) by 65 days.

(21) Appl. No.: 18/616,043

(22) Filed: Mar. 25, 2024

(65) Prior Publication Data

US 2024/0330471 A1 Oct. 3, 2024

Related U.S. Application Data

(60) Provisional application No. 63/492,620, filed on Mar. 28, 2023.

(51) Int. Cl.
*G06F 21/57* (2013.01)
*G06F 12/14* (2006.01)

(52) U.S. Cl.
CPC ............ *G06F 21/575* (2013.01); *G06F 12/14* (2013.01); *G06F 2212/1052* (2013.01); *G06F 2221/034* (2013.01)

(58) Field of Classification Search
CPC ..... G06F 21/575; G06F 12/14; G06F 12/1433
See application file for complete search history.

(56) References Cited

U.S. PATENT DOCUMENTS

| | | | | |
|---|---|---|---|---|
| 4,143,365 A * | 3/1979 | Cayzac | G01R 13/02 345/440.1 |
| 9,026,765 B1 * | 5/2015 | Marshak | G06F 3/061 711/170 |
| 2003/0140238 A1 * | 7/2003 | Turkboylari | G06F 21/575 713/193 |
| 2005/0268086 A1 * | 12/2005 | Kim | G06F 9/4401 713/2 |
| 2015/0371046 A1 | 12/2015 | Chen et al. | |

(Continued)

OTHER PUBLICATIONS

International Search Report and Written Opinion—PCT/US2024/021489—ISA/EPO—Jul. 23, 2024.

*Primary Examiner* — Matthew T Henning
(74) *Attorney, Agent, or Firm* — Gerald P. Joyce, III

(57) ABSTRACT

A processor boot architecture with a safety protected memory may include a memory protection register that supports a memory protection disable command. The memory protection disable command may be transmitted to a processor coupled to the memory protection register. The memory protection of a first memory coupled to the processor may be disabled in response to the memory protection register receiving the memory protection disable command. An initialization signal corresponding to computer code in the first memory may be transmitted from the processor to a second memory which has memory protection. The second memory may be initialized with the initialization signal and then memory protection of the first memory may be re-enabled. The first memory may include tightly coupled memory (TCM) while the second memory may include Error-Correcting Code (ECC) static random-access memory (SRAM) and/or other ECC TCMs of other processors.

18 Claims, 5 Drawing Sheets

(56) References Cited

U.S. PATENT DOCUMENTS

| | | | |
|---|---|---|---|
| 2016/0085968 | A1 | 3/2016 | Jakobsson |
| 2016/0371012 | A1* | 12/2016 | Song ..................... G06F 3/0688 |
| 2019/0129857 | A1* | 5/2019 | Shamis ............... G06F 12/0824 |
| 2021/0311827 | A1 | 10/2021 | Lu et al. |

* cited by examiner

SYSTEM AND METHOD FOR PROVIDING A PROCESSOR BOOT FOR SAFETY PROTECTED MEMORIES

BACKGROUND

Safety protected memories are generally designed so they may not be altered or updated while they are running or executing certain functions or features. For example, safety protected memories are often found in the field of automotive applications, where normal operations for a vehicle must be maintained. Normal vehicle operations may include, but are not limited to, maintaining engine speed, providing audio and/or visual navigation, maintaining vehicle cruise control, maintaining self-driving of the vehicle by a computer, etc. etc.

Safety protected memories in the automotive field often must comply with certain automotive industry standards. One such automotive industry standard as of this writing is Functional Safety (FUSA) International Standard Organization (ISO) standard 26262 ("ISO 26262"). ISO 26262 is an international functional safety standard for the development of electrical and electronic systems in road vehicles. This standard generally defines guidelines to minimize the risk of accidents and ensure that automotive components perform their intended functions correctly and at the right time.

With the safety protections required by ISO 26262, electronic memory complying with this safety standard usually cannot be accessed or updated with new or different computer code, where such different code may contain updates and/or changes. As of this writing, most safety protected memory may include static random-access memory (SRAM) which is volatile memory.

Usually, safety protected memory that is SRAM may comprise Error-Correcting Code (ECC) type SRAM. The ECC may provide single-bit error correction and double-bit error detection (SECDED) as understood by one of ordinary skill in the art.

When safety protected SRAMs or any safety protected memories (i.e. such as tightly coupled memory (TCM) of processing cores) are not initialized, they will usually contain garbage values for their ECC bits, and such status will usually cause an immediate FAULT by any further access by a system component.

Accordingly, there is a need in the art, for a method and system for updating safety protected memories while maintaining their compliance with an automotive industry standard, such as, but not limited to, ISO 26262.

SUMMARY OF THE DISCLOSURE

Systems, methods, computer-readable media, and other examples are disclosed for providing a processor boot architecture with a safety protected memory.

A method for providing a processor boot architecture with a safety protected memory may include providing a memory protection register that is capable of supporting a memory protection disable command. The memory protection disable command may be transmitted to a processor coupled to the memory protection register.

The memory protection of a first memory coupled to the boot processor may be disabled in response to the memory protection register receiving the memory protection disable command. An initialization signal corresponding to computer code in the first memory may be transmitted from the processor to a second memory which has memory protection. The second memory may be initialized with the initialization signal and then memory protection of the first memory may be re-enabled.

The first memory may include tightly coupled memory (TCM), also known in the art as Code TCM, while the second memory may include static random-access memory (SRAM) with Error-Correcting Code (ECC) memory protection. The second memory may also include the TCMs of the other processors, or any other protected memories present in the system.

According to another aspect, a system for providing a processor boot architecture with a safety protected memory may include storage means for enabling a memory protection disable command. The system may also include processor means for disabling memory protection of a first memory coupled to the processor means in response to the storage means receiving the memory protection disable command.

The processor means may transmit an initialization signal corresponding to a computer code in the first memory from the processor means to a second memory which has memory protection. The second memory may be initialized with the initialization signal. And the processor means may re-enable memory protection of the first memory after the initialization signal is transmitted.

The storage means may include a modified memory protection register while the first memory may include a tightly coupled memory (TCM). The second memory may include static random-access memory (SRAM) with Error-Correcting Code (ECC) memory protection as well as the TCMs of other processors.

In another aspect, a system for providing a processor boot architecture with a safety protected memory may include a modified memory protection register for enabling a memory protection disable command. The processor may be coupled to the modified memory protection register and a first memory. The processor may disable memory protection of the first memory in response to the modified memory protection register receiving the memory protection disable command.

The processor may transmit an initialization signal corresponding to computer code in the first memory from the processor over a bus to a second memory which has memory protection. The second memory may be initialized with the initialization signal. The processor may then re-enable memory protection of the first memory (i.e. the TCM) after the initialization signal is transmitted.

According to a further aspect, a non-transitory computer-readable medium may include computer instructions for execution by a processor that provides a processor boot architecture for protected memory. The processor boot architecture may include a memory protection register that supports a memory protection disable command. The computer instructions may include transmitting a memory protection disable command to a processor coupled to the memory protection register.

The computer instructions may further include disabling memory protection of a first memory coupled to the processor in response to the memory protection register receiving the memory protection disable command. The computer instructions may also include transmitting an initialization signal corresponding to computer code in the first memory from the processor to a second memory which has memory protection. Next, the computer instructions may include initializing the second memory with the initialization signal and then re-enabling memory protection of the first memory.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component.

One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
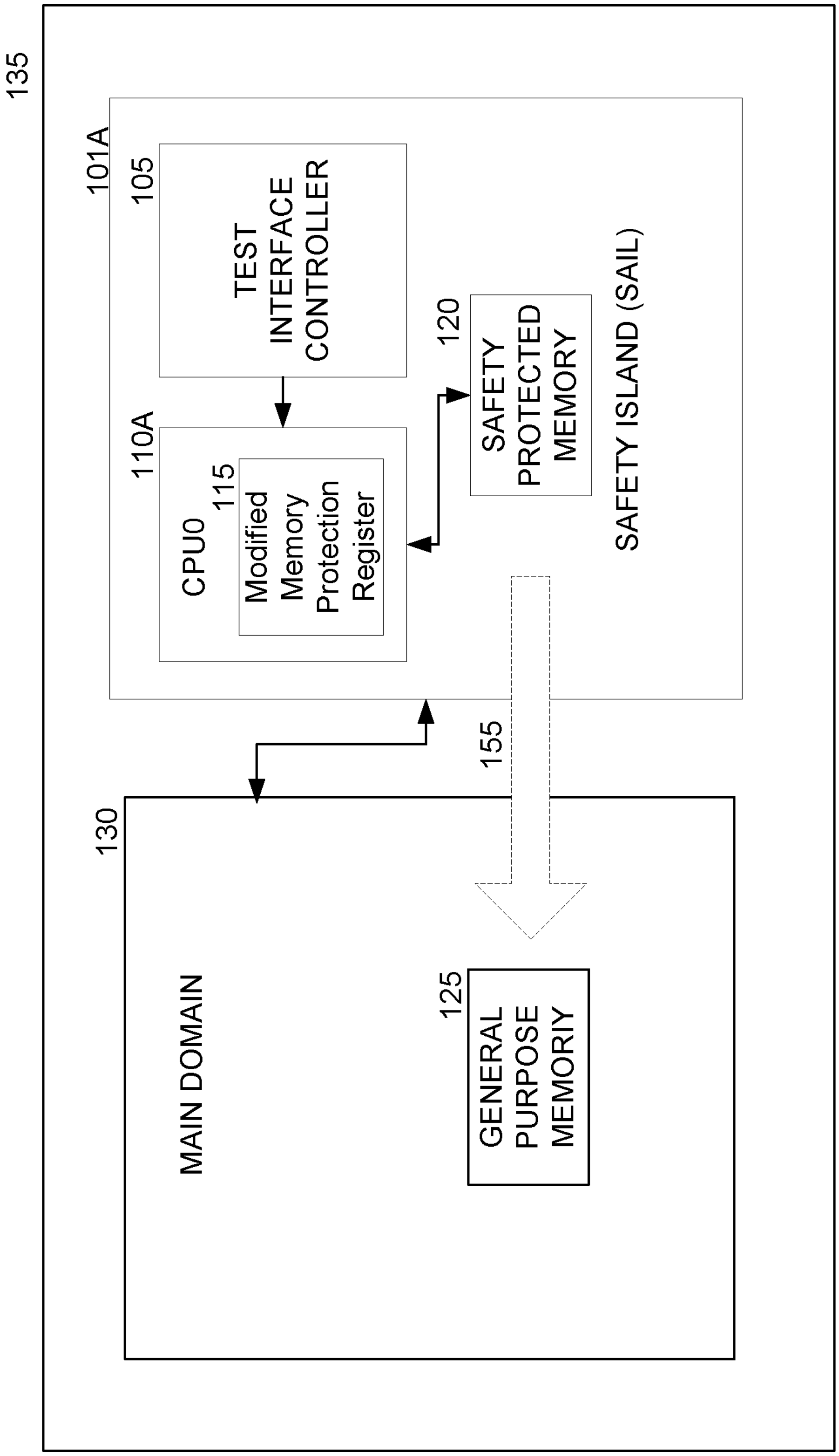
FIG. 1 illustrates a high-level diagram of a Safety Island (SAIL) primary boot module sub-system which is coupled to a main domain (MD) sub-system that form a System-on-Chip (SoC)

Referring now to FIG. 1, this figure illustrates a high-level diagram of a Safety Island (SAIL) sub-system 101A which is coupled to a main domain (MD) sub-system 130 that form a System-on-Chip (SoC). The SAIL sub-system 101A and MD sub-system 130 are provided on a single micro-chip 135. In other words, both the MD sub-system 130 and SAIL sub-system 101A may reside within or on a single micro-chip 135. The SAIL sub-system 101A and MD sub-system SoC 130 together form an SoC system 135 as understood by one of ordinary skill in the art.

When used in the field of automotive applications, the SAIL sub-system 101A may be referred to in the art as a safety island, which may be a primary boot module. Further, the SAIL sub-system 101A may be compliant with Automotive Safety Integrity Level (ASIL) Functional Safety (FUSA) standard ISO 26262 as understood by one of ordinary skill in the art.

The SoC system 101A may include a test interface controller 105, a first central processing unit (CPU) 110A, and a plurality of safety protected memories 120. The first CPU 110A may include a modified memory protection register 115. The first CPU 110A may comprise a boot processor.

The modified memory protection register (MMPR) 115 can receive and process a protection disable command. A protection disable command is one where, once received by the MMPR 115, the MMPR 115 will allow the CPU 110 to initialize a safety protected memory 120 external to the CPU 110 (and its own internal or tightly coupled memory (TCM) 210A as illustrated in FIG. 2) with zeroes "0" and Error Correcting Code (ECC), so that additional, new computer code may be loaded after the initialization into the safety protected memory 120 (and/or TCMs 210 of FIG. 2).

The CPU 110 may comprise a multi-core CPU and thus, it may include one or more CPU cores, such as a first CPU core, a second CPU core, etc., through an Nth CPU core as understood by one of ordinary skill in the art. The system 101A may also include other processors (not illustrated) such as, but not limited to, a graphics processing unit (GPU), a digital signal processor (DSP), and other types of processors.

Figure 2:
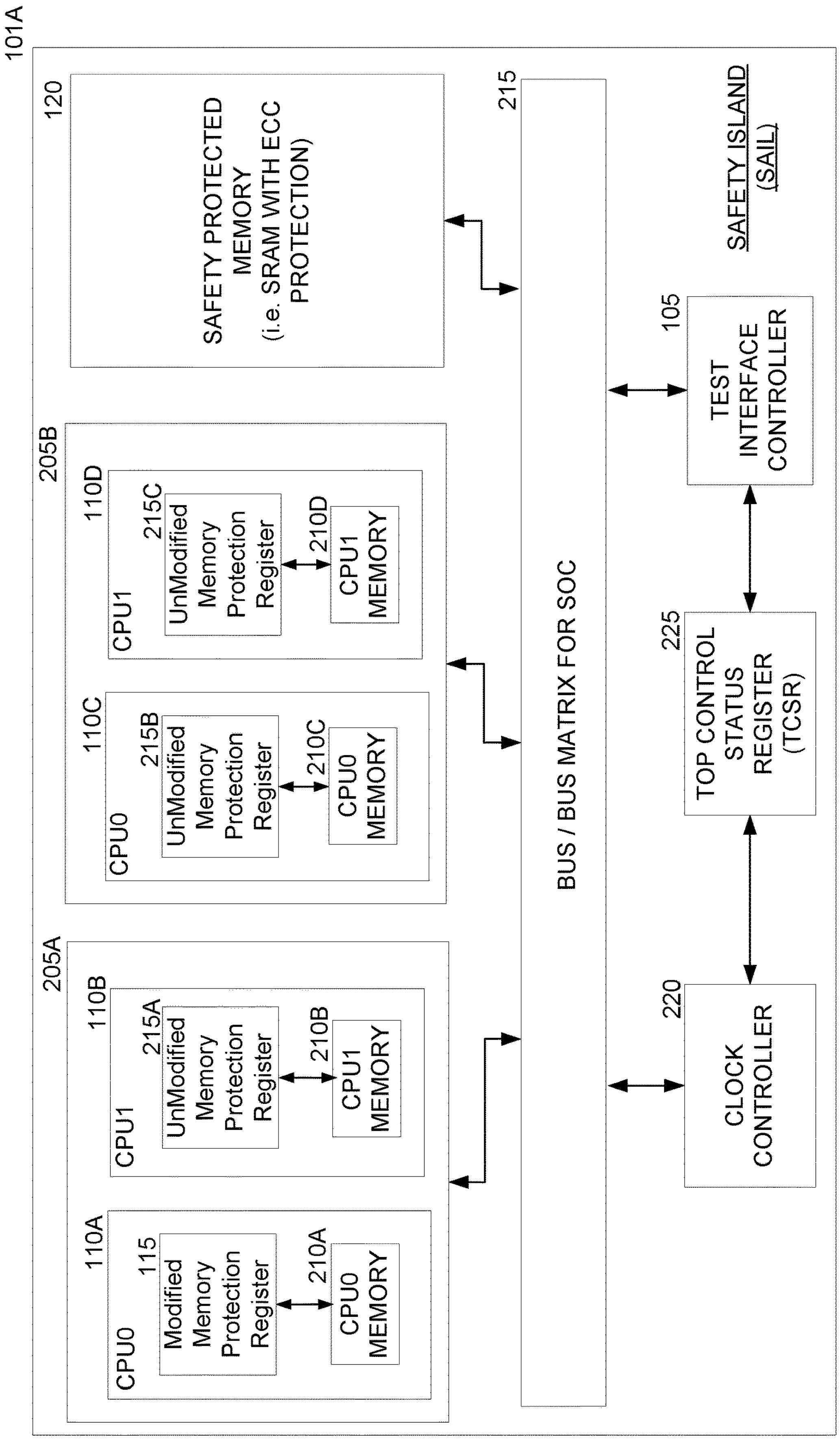
FIG. 2 illustrates a detailed diagram of the SAIL sub-system that is also illustrated in FIG. 1.

The safety protected memory 120 of FIG. 1 and TCMs 210B/C/D of FIG. 2 are generally defined as memory which is cannot usually or normally be initialized or reset. This safety protection for memory 120 of FIG. 1 and TCMs 210B/C/D of FIG. 2 are provided to prevent unwanted/undesirable hacking as well as to prevent unwanted/undesirable access while the system 101A is operating and controlling important functions (i.e. the system 101A coupled with MD 130 may support normal operations for a vehicle like maintaining engine speed, maintaining vehicle cruise control, maintaining self-driving of the vehicle by a computer, etc. etc.).

While the safety protected memory 120 of FIG. 1 (and TCMs 210B/C/D of FIG. 2) provide many benefits, such memory does prevent and/or makes it difficult to allow software for the system 101 to be updated and/or changed. Without the MMPR 115, the safety protected memory 120 of FIG. 1 (and TCMs 210B/C/D of FIG. 2) in the prior art face such challenges as described in the background section listed above.

Referring back to FIG. 1, once the MMPR 115 receives a protection disable command from the test interface controller 105, the MMPR 115 will allow the CPU 110 to initialize the safety protected memory 120 of FIG. 1 (and/or TCMs 210B/C/D of FIG. 2). Once initialized, the safety protected memory 120 (and/or TCMs 210B/C/D) may receive new computer code sent by the test interface controller 105.

Once the safety protected memory 120 of FIG. 1 (and/or TCMs 210B/C/D of FIG. 2) is updated with any new or changed computer code, the sub-system 101A may then send commands and/or any updates to general purpose memory 125 of the main domain sub-system 130 so that the main domain (MD) sub-system 130 may start its booting process. That is, the SAIL sub-system 101A may complete its boot process and then send handshake commands/signals as indicated by large arrow 155 (see FIG. 1) to allow the main domain sub-system 130 to start its boot process. The general purpose memory 125 is usually not protected (i.e. unprotected where other system components have full access and control to memory 125; memory 125 can be initialized, reset, reprogrammed, etc. at any time unlike and opposite to safety protected memory 120).

Referring now to FIG. 2, this figure illustrates a detailed diagram of the SAIL sub-system 101A that is also illustrated in FIG. 1. As noted previously in connection with FIG. 1, the SoC system 101A may include a first CPU 110A, a test interface controller 105, and safety protected memory 120.

The SoC system 101A may further include a second CPU 110B, a third CPU 110C, and a fourth CPU 110D. Each CPU 110 may also have its own memory protection register 115 or 215. Each CPU 110 may also have its own CPU memory 210 that may include a tightly coupled memory (TCM). TCM 210, also known to one of ordinary skill in the art as code TCM 210, is directly connected to the CPU 110.

Each TCM 210 may be physically within a CPU core 110 or external to the core 110. If external to a CPU core 110, the TCM 210 is usually very close/proximate to the core 110, which is unlike and opposite to cache type memory. The TCM 210 may comprise random access memory (RAM) or any other type of volatile or even non-volatile memory as understood by one of ordinary skill in the art. The TCM 210 provides low-latency memory access for each CPU core 110 without the unpredictability of access time that is a feature of conventional cache type memory.

As noted previously, only one CPU 110 of the SAIL subsystem 101A, here the first CPU 110A, will have a modified memory protection register (MMPR) 115. The MMPR 115 is capable of receiving a protection disable command so that only the first CPU 111A can reset or initialize the safety protected memory 120 and/or other TCMs 210B/C/D of CPUs 110B/C/D only when the SAIL sub-system 101A is in a test interface controller (TIC) mode, as explained in more detail below.

Meanwhile, the remaining three CPUs 110—110B, 110C, 110D—have unmodified (or regular/standard) memory protection registers 215A, 215B, 215C. These unmodified memory protection registers 215C are not capable of receiving or supporting a protection disable command in the TIC mode noted above.

Each CPU memory 210A, 210B, 210C, 210D may comprise TCM as understood by one of ordinary skill in the art. The first CPU memory 210A (after the MMPR 115 receives the protection disable command) may also receive preamble code from the TIC 105 via the clock controller 220, and originating from a top control status register 225 when the system 101A is in a test interface controller (TIC) mode.

The safety protected memory 120 may comprise one or more static random-access memory (SRAM). The CPU memories 210B/C/D are also safety protected memories due to the unmodified memory protection registers 215. Safety protected memory 120 as well as CPU memories 210 may comprise volatile memory as understood by one of ordinary skill in the art.

According to one exemplary embodiment, the safety protected memory 120 may comprise Error-Correcting Code (ECC) type SRAM. The ECC may provide single-bit error correction and double-bit error detection (SECDED) as understood by one of ordinary skill in the art. Further, other memories may be included in the system 101A, such as Dynamic Random Access Memory (DRAM). Additionally, the SAIL sub-system 101A may further comprise non-volatile memories in addition to the volatile memories described above.

Generally, if a safety protected memory, like an SRAM 120 or CPU memory 210, are not initialized, they will usually contain garbage values for their ECC bits, and such status will usually cause an immediate FAULT by any further access by a system component. Other types of safety protected memory, besides ECC SRAM, are possible for the system 101A and are included within the scope of this disclosure.

The first CPU 110A and second CPU 110B may form a first CPU cluster 205A. Similarly, the third CPU 110C and fourth CPU 110D may form a second CPU cluster 205B. The system 101A may include fewer or additional CPU clusters 205 as understood by one of ordinary skill in the art. Each CPU 110 may comprise a single core or a multi-core (i.e. multi-cores) as understood by one of ordinary skill in the art.

The SAIL sub-system 101A may further include a communication bus or bus matrix 215, a clock controller 220, and a top controller status register (TCSR) 225. The first CPU cluster 205A, second CPU cluster 205B, safety protected memory 120, and clock controller 220 may be coupled to the communication bus/bus matrix 215. The bus matrix 215 may relay commands/signals among these system elements. The bus matrix may also be referred to as a network-on-a-chip or "NoC" as understood by one of ordinary skill in the art.

As mentioned above, the modified memory protection register (MMPR) 115 enables access to the first CPU memory 210A of the first CPU 110A ("boot" CPU 110A) while the SAIL sub-system 101A is in a test interface controller (TIC) mode. Specifically, the protection disable command is received by MMPR 115 from the TIC 105 and TCSR 225 via the clock controller 220 and bus matrix 215. Once the protection disable command is received by the MMPR 115, the TIC 105 may transmit first code via the bus matrix 215 to the first CPU memory 210A as will be described in detail below. The TIC 105 may transmit second code via the bus matrix 215 to the first CPU memory 210A and the other CPU memories 210B/C/D and/or the larger memory 120 if certain conditions are met as will be described in detail below.

The first CPU memory 210A (i.e. TCM) after loaded with the first code (preamble code) may then cause the first CPU 110A to transmit signals via the bus matrix 215 to initialize the safety protected memory 120 (i.e. ECC SRAM) and/or CPU memories 210B/C/D (i.e. the TCMs of other processors 110). These initialization signals sent by the first CPU memory 210A may comprise zeroes "0" and error correction code (ECC) as understood by one of ordinary skill in the art. After these initialization signals are sent, further access to the second larger memory 120 (i.e. SRAM) and second CPU memories 210B/C/D will not cause FAULTS as these memories have sane/regular ECC values in response to the initialization/re-set.

The first code (i.e. preamble code) may be accompanied by second code (i.e. new boot code) and transmitted over the bus matrix 215 from the TIC 105 if the second code is less than or equal the size of the first CPU memory 210A, which in this exemplary embodiment is about 64 kilobytes (KB). When the first code is accompanied by second code that is less than or equal to about 64 KB, this second code may be transmitted by the first CPU 110A to the other three CPUs 110B, 110C, 110D to be loaded in each of their CPU memories 210B, 210C, 210D and for execution by each CPU 110. Alternatively, the other CPUs 110B, 110C, 110D may directly execute the second code from the first CPU memory 210A itself via the bus matrix 215 with the address pointing to a mapped address of the first CPU 110A. This direct execution of the second code by each other CPU 110B, 110C, 110D is generally preferred as it saves re-transmission time of the code to the other CPU memories 210B, 210C, 210D.

Once the second code is loaded in the first CPU memory 210A after being received via the bus matrix 215 from the TIC 105, the first code may send the MMPR 115 a re-enable protection command. The re-enable protection command re-activates/re-enables memory protection of the first CPU memory 210A.

If the second code (i.e. new boot code) is greater than (>) the size of the first CPU memory 210A (i.e. greater than >64 KB), then the first code may instruct the protected memory 120 to receive the second code from the TIC 105 (i.e. via TCSR 225, clock controller 220, and NoC 215). After instructing the protected memory 120 to receive the second code from the TIC 105, the first code may send the MMPR 115 a re-enable protection command to re-enable memory protection of the first CPU memory 210A.

Meanwhile, subsequently or in parallel to the re-enable memory protection command, the larger protected memory 120 may receive the second code that is greater than the size of the first CPU memory 210A (i.e. >64 KB). One of ordinary skill in the art recognizes that other thresholds greater than or less than 64 KB, which are dependent on memory sizes, are possible and are included within the scope of this disclosure.

Once the SAIL sub-system 101A has booted based on the second code, it may send signals 155 (i.e. handshake signals 155 of FIG. 1) to the main domain sub-system 130 (see FIG. 1) having general purpose (i.e. unprotected) memory 125. The main domain sub-system 130 may then boot once it receives the handshake signals 155 from the SAIL sub-system 101A.

As noted above, the sub-system 101A may support automotive applications. Specifically, sub-system 101A may be characterized as a primary boot sub-system. This primary boot sub-system 101A may be characterized as a SAfety IsLand (SAIL) which may facilitate compliance with Automotive Safety Integrity Level (ASIL)—FUnctional SAfety (FUSA) International Safety Organization (ISO) standard 26262.

Other fields of use for the SAIL sub-system 101A may include, but are not limited to, robotics, other terrain-based vehicles besides automobiles (i.e. trucks, motorcycles, etc.) as well as aeronautical vehicles (i.e. drones, missiles/rockets, airplanes, helicopters, etc.) and maritime vehicles like ships and hovercrafts. However, other fields of use for sub-system 101A are possible, such as, but not limited to, portable computing devices (PCDs), like mobile phones, computers, tablet PCs, etc.

Figure 3A:
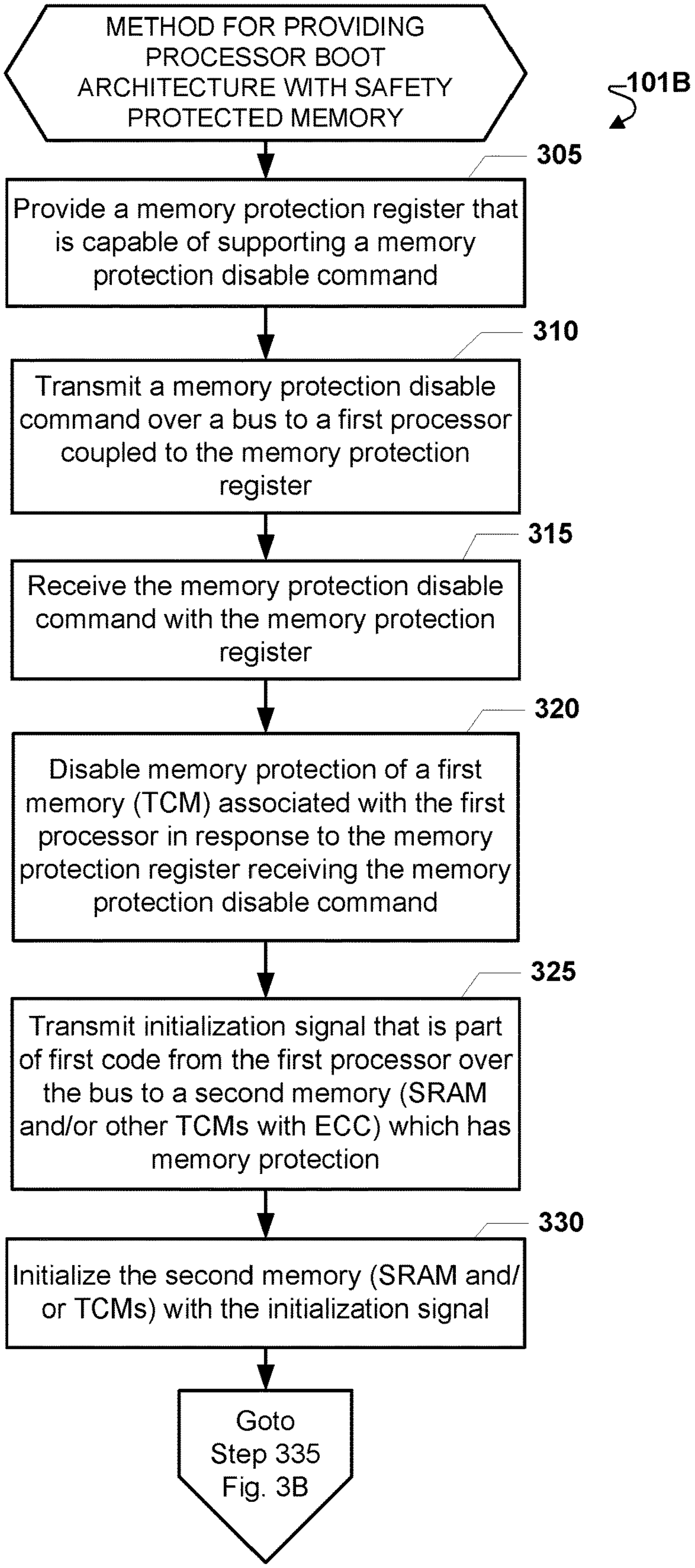
FIG. 3A illustrates a method for providing a processor boot for safety protected memories according to one exemplary embodiment that corresponds with FIGS. 1-2.

Referring now to FIG. 3A, this figure illustrates a method 101B for providing processor boot for safety protected memories according to one exemplary embodiment. Step 305 is the first step of method 305.

In step 305, a modified memory protection register (MMPR) 115 is provided with a first processor 110A, such as illustrated in FIG. 1 described above. The MMPR 115 is capable of supporting a memory protection disable command.

Next in step 310, a memory protection disable command is transmitted over a bus 215 of an SoC system 101A to the first processor 110A from the TIC 105 via the TCSR 225 and clock controller 220. The first processor 110A is coupled to the MMPR 115, such as illustrated in FIG. 2 described previously.

Specifically, the test interface controller (TIC) 105 may originate the memory protection disable command while the SoC system 101A is in a TIC mode. The TIC 105 may send the memory protection disable command to a top control status register 225 which then relays the command to a clock controller 220 of the SoC 101A. The clock controller 220 is responsible for transmitting the disable command over the bus 215 to the first processor 110A.

Subsequently, in step 315, the memory protection disable command is received with the MMPR 115 from the first processor 110A via the bus matrix 215 and clock controller 220. Next, in step 320, the memory protection of a first memory 210A associated with the first processor 110A is disabled in response to the MMPR 115 receiving the disable command. The first CPU memory 210A associated with the first CPU 110A may comprise an Tightly Coupled Memory (TCM)(also known as code TCM) 210A as described previously and as understood by one of ordinary skill in the art.

Subsequently, in step 325, the first CPU 110A transmits an initialization signal that is part of a first code stored in the first memory 210A. This first code was received from the bus matrix 215 and the TIC 105. The TIC 105 is able to transmit the first code over the bus matrix 215 to the first CPU memory 210A once the memory protection of the first CPU memory 210A is disabled. In this step 325, the first CPU 110A may transmit this initialization signal, that is part of this first code stored in the first CPU memory 210A, over the bus 215 to a second memory, which may include memory 120 and/or CPU memories 210B/C/D TCM that have memory protection as illustrated in FIG. 2. As described previously, the second memory, like larger memory 120 may comprise SRAM with ECC protection. The second memory may also comprise smaller CPU memories 210B/C/D that include TCM with ECC as understood by one of ordinary skill in the art.

The ECC protection of the second memory 120 and CPU memories 210B/C/D TCM may provide single-bit error correction and/or double-bit error detection (SECDED) as understood by one of ordinary skill in the art. If SRAMs 120 and TCMs 210 with ECC are not initialized, they will usually contain garbage values for their ECC bits, and such status will usually cause an immediate FAULT by any further access by a system component. Other types of memory, besides the larger ECC SRAM 120 & smaller ECC TCMs 210, are possible for the sub-system 101A and method 101B. Other types of memory are included within the scope of this disclosure.

Next, in step 330, the second memory (i.e. SRAM 120 and/or TCMs 210B/C/D) is initialized with the initialization signal received from the first CPU 110A. As part of step 330, the first CPU 110A may also initialize its own CPU memory (i.e. TCM) 210A as a part of the first code (i.e. preamble code) after restoring its protection, thus ensuring when TIC 105 issues any further accesses to it (i.e. such as sending second code), it will not cause any FAULTs, allowing TIC 105 to download the second code directly to first CPU memory 210A of first CPU 110A The method of 101B illustrated in FIG. 3A then continues to step 335 of FIG. 3B.

Figure 3B:
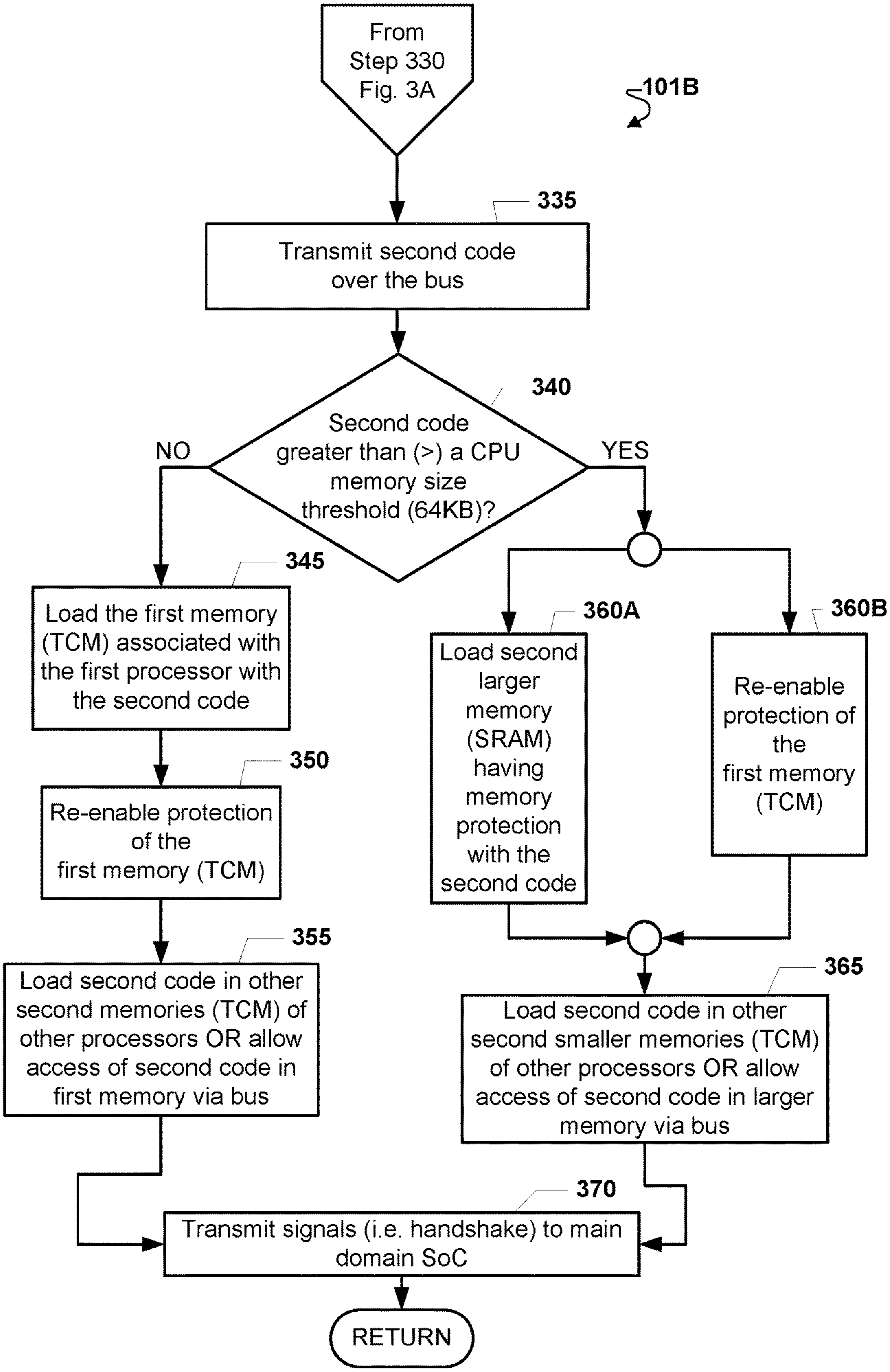
FIG. 3B illustrates a continuation flow diagram for the method illustrated in FIG. 3A.

Referring now to FIG. 3B, this figure illustrates a continuation flow diagram of method 101B for the flow diagram illustrated in FIG. 3A. In step 335, the TIC 105 transmits the second code over the bus 215 to the first CPU 110A.

Next, in decision step 340, it is determined if the second code is greater than (>) a memory size threshold of the CPU memories 210. According to one exemplary embodiment, the size threshold of CPU memory 210 (i.e. TCM) may comprise a magnitude of sixty-four (64) Kilobytes (KB). However, other size thresholds (i.e. memory sizes) are possible and are included within the scope of this disclosure.

This decision step 340 is predetermined (i.e. decided) before the second code is loaded and handled by the TIC 105. That is, the memory size of CPU memories 210 is a known magnitude/value before the second computer code is created. If the second computer code is greater than the memory size threshold of the CPU memories 210, then the second code includes instructions for the TIC 105 to load the second code into the larger safety protected memory 120 (i.e. SRAM) and not the other smaller CPU memories 210A, 210B, 210C, 210D (i.e. 64 KB in this example). Again, thresholds greater than 64 KB are possible for CPU memories 210 and are included within the scope of this disclosure.

As noted previously, the first code may comprise preamble code which resets or initializes the larger memory 120 which may be SRAM that has ECC protection, as well as resetting or initializing CPU memories 210B/C/D (i.e. TCMs) of the other three processors 110B/C/D. The first code (i.e. preamble code) may be written in such a way to make the first CPU 110A initialize both SRAM 120 and CPU memories 210B/C/D: thus, making all the memories accessible by TIC 105 safely, as all the memories 120, 210 will now be initialized with proper ECC values (i.e. zeroes "0s"+ECC) from this first preamble code.

Meanwhile, the second code may comprise other code which is different than the preamble code. This second code may comprise new computer code to provide new functions and/or features for the SAIL sub-system 101A.

Referring back to FIG. 3B, in decision step 340, if it is determined that the second code containing the new functions/features/updates for the SoC system 101A is greater than (>) the first CPU memory size threshold (i.e. CPU 210A—size of 64 KB, in this exemplary embodiment), then the "YES" branch may be followed to steps 360A, 360B described in further detail below. If it is determined that the second code containing the new functions/features/updates for the SoC system 101A is less than (<) or equal (=) to the size threshold of the first CPU memory 210A (i.e. 64 KB), then the "NO" branch may be followed to steps 345 described in further detail below.

In step 345, from the "NO" branch of decision step 340, the first CPU 110A may load the first memory 210A with the second code that is generally less than or equal to the threshold CPU memory size (i.e. < or =64 KB). Then in step 350, the first CPU 110A may then re-enable protection of the first memory 210A. This means the first CPU 110A may re-set the MMPR 115 to a value which means memory protection is enabled for first memory 210A (i.e. TCM 210A).

Next, in step 355, the first CPU 110A may send the second code over the bus 215 to other CPU memories 210 (i.e. TCMs) of other processors 110B, 110C, 110D of the SAIL sub-system 101A, so that the other processors 110B, 110C, 110D may execute the second code. Alternatively, in step 355, the other processors 110B, 110C, 110D may execute the second code from the first CPU memory 210A by gaining access via bus/NoC 215.

This alternate step 355 where the other three processors 110B, 110C, 110D execute the second code stored in the first CPU memory 210A by gaining access via bus 215 is generally preferred. It is preferred because it avoids duplication of the second code at multiple CPU memories 210B/C/D and thus, the extra transfer/transmission time to those memories 210B/C/D.

Subsequently, in step 370, the first processor 110A of SoC 101A may transmit signals 155 to the main domain sub-system 130 (see FIG. 1). These signals 155 transmitted to the main domain sub-system 130 may comprise handshake signals so that the main domain SoC 130 may then boot/start its operations. The method/process 101B may then return.

Referring back to the "YES" branch exiting decision step 340 where it is determined that the second code is greater than the CPU memory size threshold (i.e. >64 KB in this example), in Step 360A, the first CPU 110A then transmits the second code over the bus 215 to the second larger memory 120 (i.e. SRAM) that has memory protection (i.e. ECC protection) and not to the other, smaller second CPU memories 210B/C/D of CPUs 110B/C/D.

Step 360B is illustrated as being performed in parallel with step 360A. Steps 360A & 360B may be performed in parallel or in sequence (i.e. in a serial fashion if desired). When performed in sequence or in a serial fashion, either step may be performed before the other (and vice-versa). In Step 360B, the first CPU 110A may re-enable protection of the first CPU memory 210A (i.e. TCM type memory). This means the first CPU 110A may re-set the MMPR 115 to a value which means memory protection is enabled for first memory 210A (i.e. TCM 210A).

Next, in step 365, after the second larger memory 120 (i.e. SRAM) is loaded with the second code, the first CPU 110A or TIC 105 may copy portions of the second code (i.e. sizes less than or equal to 64 KB) to the other CPU memories 210B, 210C, 210D. The CPUs 110A-110D may then execute this second code from their respective CPU memories 210A-210D.

Alternatively, in step 365, the processors 110A-110D may execute portions of the second code from the second larger memory (i.e. SRAM) by gaining access to the second code via the bus/NoC 215. This alternative step 365 that allows access to the second code stored in the second larger memory 120 (i.e. SRAM) via bus 215 is generally preferred because it avoids duplication of the second code at multiple CPU memories 210A-210D and thus, the transmission/transfer time of that second code to those memories 210.

Subsequently, in step 370, the SAIL sub-system 101A may transmit signals 155 (i.e. handshake signals 155 of FIG. 1) to the main domain sub-system 130 (see FIG. 1) so that the main domain sub-system 130 may then boot/start its operations. The method/process of 101B illustrated in FIG. 3B may then return.

Figure 4:
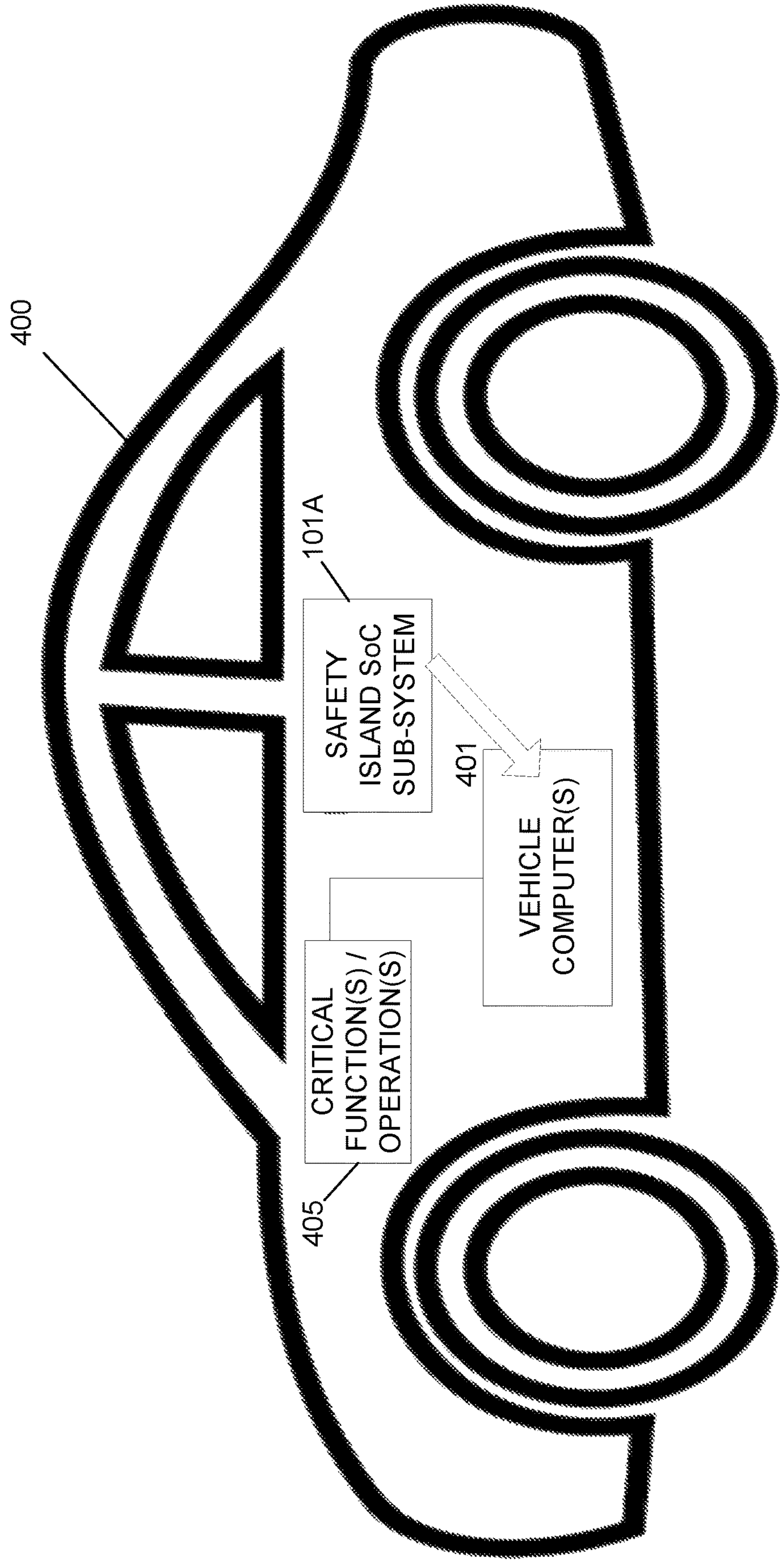
FIG. 4 illustrates a vehicle in which the system of FIGS. 1-2 may be employed in according to one exemplary embodiment.

Referring now to FIG. 4, this figure illustrates a vehicle 400 in which the system of FIGS. 1-2 may be employed according to one exemplary embodiment. The vehicle 400 may have one or more vehicle computers 401 in which the SoC system 101A of FIGS. 1-2 may be employed. The one or more vehicle computers 401 may help and/or control certain critical function(s)/operation(s) of the vehicle 400.

Critical function(s)/operation(s) of the vehicle 400 may include, but are not limited to, maintaining engine speed, maintaining vehicle speed (i.e. cruise control), and maintaining self-driving of the vehicle by a computer, etc. etc. As noted previously, the SoC system 101A is well suited for safety protected memories in the automotive field. Safety protected memories in the automotive field usually must comply with certain automotive industry standards.

As described above, one such automotive industry standard as of this writing is Functional Safety (FUSA) International Standard Organization (ISO) standard 26262 ("ISO 26262"). ISO 26262 is an international functional safety standard for the development of electrical and electronic systems in road vehicles. This standard generally defines guidelines to minimize the risk of accidents and ensure that automotive components perform their intended functions correctly and at the right time.

With the safety protections required by ISO 26262, electronic memory complying with this safety standard usually cannot be accessed or updated with new or different computer code, where such different code may contain updates and/or changes. As of this writing, most safety protected memory may include static random-access memory (SRAM) which is volatile memory.

As noted previously, the modified sub-system 101A of FIGS. 1-2 may allow for new computer code to be loaded and executed following the steps outlined in method 101B illustrated in FIGS. 3A-3B. The modified sub-system 101A may also maintain compliance with ISO 26262, as well as others as understood by one of ordinary skill in the art.

Other fields of use for the SoC system 101A may include, but are not limited to, other terrain-based vehicles besides automobiles (i.e. trucks, motorcycles, etc.) as well as robotics, heavy lifting machinery, aeronautical vehicles (i.e. drones, missiles/rockets, airplanes, helicopters, etc.), and maritime vehicles like ships and hovercrafts.

The one or more of the method steps described herein (such as illustrated in FIGS. 3A-3B) may be stored in the first CPU memory 210A and second larger memory 120 and/or other smaller CPU memories 210B/C/D as computer program instructions. These instructions may be executed by the central processing unit 110A, TIC 105, and other processors 110B/C/D to perform the methods described herein. Further, the first processor 110A, first CPU memory 210A, and larger memory 120 and/or smaller CPU memories 210B/C/D, the instructions stored therein, or a combination thereof may serve as a means for performing one or more of the method steps described herein.

The steps in the processes or process flows described in this specification (i.e. FIGS. 3A-3B) naturally precede others for the system and method to function as described. However, the system and method not limited to the order of the steps described if such order or sequence does not alter the functionality of the system and method. That is, it is recognized that some steps may performed before, after, or parallel (substantially simultaneously with) other steps without departing from the scope and spirit of this disclosure.

In some instances, certain steps may be omitted or not performed without departing from this disclosure. Further, words such as "thereafter", "then", "next", etc. are not intended to limit the order or sequence of the steps. These words are simply used to guide the reader through the description of the exemplary method and system.

Additionally, one of ordinary skill in programming is able to write computer code or identify appropriate hardware and/or circuits to implement the disclosed computer-based system and method without difficulty based on the flow charts and associated description in this specification, for example.

Therefore, disclosure of a particular set of program code instructions or detailed hardware devices is not considered necessary for an adequate understanding of how to make and use the system and method. The improved functionality of the claimed computer implemented processes are explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any non-transitory computer-readable medium that facilitates transfer of a computer program from one place to another. A non-transitory computer-readable medium may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Implementation examples are described in the following numbered clauses.

1. A method for providing a processor boot architecture with a safety protected memory, the method comprising:

providing a memory protection register that is capable of supporting a memory protection disable command;

transmitting a memory protection disable command to a processor coupled to the memory protection register;

disabling memory protection of a first memory coupled to the processor in response to the memory protection register receiving the memory protection disable command;

transmitting an initialization signal corresponding to computer code in the first memory from the processor to a second memory which has memory protection;

initializing the second memory with the initialization signal; and re-enabling memory protection of the first memory.

2. The method of clause 1, wherein the first memory comprises tightly coupled memory (TCM).

3. The method of clauses 1-2, wherein the second memory comprises at least one of static random-access memory (SRAM) and other tightly coupled memory (TCM).

4. The method of clauses 1-3, wherein memory protection of the second memory comprises Error-Correcting Code (ECC).

5. The method of clauses 1-4, wherein the computer code is first computer code, the method further comprising loading second computer code into the first memory if the second computer code is less than or equal to a predetermined size threshold.

6. The method of clauses 1-5, wherein the computer code is first computer code, the method further comprising loading second computer code into the second memory if the second computer code is greater than a predetermined size threshold.
7. The method of clauses 1-6, wherein the first memory, the second memory, and processor are part of a system-on-chip (SoC).
8. The method of clauses 1-7, wherein a test interface controller transmits the memory protection disable command that is part of the computer code to a clock controller which relays the memory protection command to the processor.
9. The method of clauses 1-8, further comprising activating a test interface controller mode for the processor and the first memory.
10. A system for providing a processor boot architecture with a safety protected memory, the system comprising:

storage means for enabling a memory protection disable command; and processor means for disabling memory protection of a first memory coupled to the processor means in response to the storage means receiving the memory protection disable command; the processor means transmitting an initialization signal corresponding to a computer code in the first memory from the processor means to a second memory which has memory protection, the second memory being initialized with the initialization signal; and the processor means re-enabling memory protection of the first memory after the initialization signal is transmitted.

11. The system of clause 10, wherein the storage means comprises a modified memory protection register for supporting the memory protection disable command.
12. The system of clauses 10-11, wherein the processor means comprises at least one of a central processing unit and a multi-core processor.
13. The system of clauses 10-12, wherein the first memory comprises tightly coupled memory (TCM).
14. The system of clauses 10-13, wherein the second memory comprises at least one of static random-access memory (SRAM) and tightly coupled memory (TCM).
15. The system of clause 14, wherein memory protection of the second memory comprises Error-Correcting Code (ECC).
16. The system of clauses 10-15, wherein the computer code is first computer code, the system further comprising the first memory being loaded with second computer code if the second computer code is less than a predetermined size threshold.
17. The system of clauses 10-15, wherein the computer code is first computer code, the system further comprising the second memory being loaded with second computer code if the second computer code is greater than a predetermined size threshold.
18. The system of clauses 10-17, wherein the first memory, the second memory, and processor are part of a system-on-chip (SoC).
19. A system for providing a processor boot architecture with a safety protected memory, the system comprising:

a modified memory protection register for enabling a memory protection disable command; and a processor coupled to the modified memory protection register and a first memory, the processor disabling memory protection of the first memory in response to the modified memory protection register receiving the memory protection disable command; the processor transmitting an initialization signal corresponding to computer code in the first memory from the processor over a bus to a second memory which has memory protection, the second memory being initialized with the initialization signal; and the processor re-enabling memory protection of the first memory after the initialization signal is transmitted.

20. The system of clause 19, wherein the processor comprises at least one of a central processing unit and a multi-core processor.
21. The system of clauses 19-20, wherein the first memory comprises tightly coupled memory (TCM).
22. The system of clauses 19-21, wherein the second memory comprises at least one of static random-access memory (SRAM) and tightly coupled memory (TCM).
23. The system of clause 22, wherein memory protection of the second memory comprises Error-Correcting Code (ECC).
24. A non-transitory computer-readable medium comprising computer instructions for execution by a processor that provides a processor boot architecture for protected memory, the computer instructions comprising:

providing a memory protection register that is capable of supporting a memory protection disable command;

transmitting a memory protection disable command to a processor coupled to the memory protection register;

disabling memory protection of a first memory coupled to the processor in response to the memory protection register receiving the memory protection disable command;

transmitting an initialization signal corresponding to computer code in the first memory from the processor to a second memory which has memory protection;

initializing the second memory with the initialization signal; and re-enabling memory protection of the first memory.

25. The non-transitory computer-readable medium of clause 24, wherein the first memory comprises tightly coupled memory (TCM).
26. The non-transitory computer-readable medium of clauses 24-25, wherein the second memory comprises at least one of static random-access memory (SRAM) and tightly coupled memory (TCM).
27. The non-transitory computer-readable medium of clauses 24-26, wherein the computer code is first computer code, the computer instructions further comprise loading second computer code into the first memory if the second computer code is less than or equal to a predetermined size threshold.
28. The non-transitory computer-readable medium of clauses 24-26, wherein the computer code is a first computer code, the computer instructions further comprise loading second computer code into the second memory if the second code is greater than a predetermined size threshold.
29. The non-transitory computer-readable medium of clauses 24-28, wherein the first memory, the second memory, and processor are part of a system-on-chip (SoC).
30. The non-transitory computer-readable medium of clauses 24-29, wherein a test interface controller transmits the memory protection disable command that is part of the computer code to a clock controller which relays the memory protection command to the processor.

Although selected aspects have been illustrated and described in detail, it will be understood that various substitutions and alterations may be made therein without departing from the scope of the disclosure, as defined by the following claims.

What is claimed is:

1. A method for providing a processor boot architecture with a safety protected memory, the method comprising:

providing a memory protection register that is capable of supporting a memory protection disable command;

transmitting a memory protection disable command to a processor coupled to the memory protection register;

disabling memory protection of a first memory coupled to the processor in response to the memory protection register receiving the memory protection disable command;

loading computer code in the first memory after disabling memory protection of the first memory;

transmitting an initialization signal corresponding to the computer code in the first memory from the processor to a second memory which has memory protection, wherein the memory protection of the second memory comprises Error-Correcting Code (ECC);

initializing the second memory with values corresponding to the initialization signal, wherein initializing the second memory enables access of the second memory without the memory protection of the second memory raising an ECC fault condition; and re-enabling memory protection of the first memory.

2. The method of claim 1, wherein the first memory comprises tightly coupled memory (TCM).

3. The method of claim 2, wherein the second memory comprises at least one of static random-access memory (SRAM) and other tightly coupled memory (TCM).

4. The method of claim 1, wherein the computer code is first computer code, the method further comprising loading second computer code into the first memory if the second computer code is less than or equal to a predetermined size threshold.

5. The method of claim 1, wherein the computer code is first computer code, the method further comprising loading second computer code into the second memory if the second computer code is greater than a predetermined size threshold.

6. The method of claim 1, wherein the first memory, the second memory, and processor are part of a system-on-chip (SoC).

7. The method of claim 1, wherein a test interface controller transmits the memory protection disable command that is part of the computer code to a clock controller which relays the memory protection command to the processor.

8. The method of claim 1, further comprising activating a test interface controller mode for the processor and the first memory.

9. A system for providing a processor boot architecture with a safety protected memory, the system comprising:

storage means for enabling a memory protection disable command; and processor means for disabling memory protection of a first memory coupled to the processor means in response to the storage means receiving the memory protection disable command; the processor means loading computer code in the first memory after disabling memory protection of the first memory; the processor means transmitting an initialization signal corresponding to the computer code in the first memory from the processor means to a second memory which has memory protection, wherein the memory protection of the second memory comprises Error-Correcting Code (ECC), the second memory being initialized with values corresponding to the initialization signal, wherein the second memory being initialized enables access of the second memory without the memory protection of the second memory raising an ECC fault condition; and the processor means re-enabling memory protection of the first memory after the initialization signal is transmitted.

10. The system of claim 9, wherein the storage means comprises a modified memory protection register for supporting the memory protection disable command.

11. The system of claim 9, wherein the processor means comprises at least one of a central processing unit and a multi-core processor.

12. The system of claim 9, wherein the first memory comprises tightly coupled memory (TCM).

13. The system of claim 9, wherein the second memory comprises at least one of static random-access memory (SRAM) and tightly coupled memory (TCM).

14. The system of claim 9, wherein the computer code is first computer code, the system further comprising the first memory being loaded with second computer code if the second computer code is less than a predetermined size threshold.

15. The system of claim 9, wherein the computer code is first computer code, the system further comprising the second memory being loaded with second computer code if the second computer code is greater than a predetermined size threshold.

16. The system of claim 9, wherein the first memory, the second memory, and processor are part of a system-on-chip (SoC).

17. A system for providing a processor boot architecture with a safety protected memory, the system comprising:

a modified memory protection register for enabling a memory protection disable command; and a processor coupled to the modified memory protection register and a first memory, the processor disabling memory protection of the first memory in response to the modified memory protection register receiving the memory protection disable command; the processor enabling loading computer code in the first memory after disabling memory protection of the first memory; the processor transmitting an initialization signal corresponding to the computer code in the first memory from the processor over a bus to a second memory which has memory protection, wherein the memory protection of the second memory comprises Error-Correcting Code (ECC), the second memory being initialized with values corresponding to the initialization signal, wherein the second memory being initialized enables access of the second memory without the memory protection of the second memory raising an ECC fault condition; and the processor re-enabling memory protection of the first memory after the initialization signal is transmitted.

18. The system of claim 17, wherein the processor comprises at least one of a central processing unit and a multi-core processor.

* * * * *